United States Patent [19]

Stuch

[11] Patent Number: 4,824,014

[45] Date of Patent: Apr. 25, 1989

[54] GENERATION OF A SET POINT IN A HEATING CONTROL SYSTEM

[75] Inventor: Dieter Stuch, Wermelskirchen, Fed. Rep. of Germany

[73] Assignee: Joh. Vaillant GmbH. u. Co., Remscheid, Fed. Rep. of Germany

[21] Appl. No.: 604,725

[22] Filed: Apr. 27, 1984

Related U.S. Application Data

[63] Continuation-in-part of Ser. No. 000,132, Jul. 30, 1983.

[30] Foreign Application Priority Data

Aug. 28, 1982 [DE] Fed. Rep. of Germany ....... 8224608
Aug. 28, 1982 [DE] Fed. Rep. of Germany ....... 8224607
Feb. 11, 1983 [DE] Fed. Rep. of Germany ....... 8303819

[51] Int. Cl.$^4$ ................................................ F24D 3/00
[52] U.S. Cl. .................................... 237/8 R; 236/91 F
[58] Field of Search ................... 236/91 F, 9 A, 20 R; 237/8 R; 165/39, 40

[56] References Cited

FOREIGN PATENT DOCUMENTS 2651560 5/1978 Fed. Rep. of Germany .... 236/91 F
2901566 7/1980 Fed. Rep. of Germany .... 236/91 F Primary Examiner—Henry Bennett
Attorney, Agent, or Firm—Horst M. Kasper

[57] ABSTRACT

A system is provided for generation of a set point for a control or automatic feed back control of the feed line temperature in a heating plant depending on the outside temperature. Usually such set points are entered as heating curves into the controller. The heating curves are in reality nonlinear relationships and are difficult to be processed by a computer. The invention subdivides the heating curve into two straight lines, which meet at a common point. This point is placed where the maximum difference occurs between the heating curve and a linear relationship connecting points corresponding to a minimum permissible lowest temperature and to a sufficient high outside where no heating energy is required. Operation according to the invention saves energy by better approximating the temperature requirements of inside rooms at different outside temperatures and this increases the comfort of the persons staying there.

20 Claims, 9 Drawing Sheets

GENERATION OF A SET POINT IN A HEATING CONTROL SYSTEM

CROSS-REFERENCE TO RELATED APPLICATIONS

This application is a continuation-in-part application of another application filed July 30, 1983 and bearing application Ser. No. DE83/00132. This claim is made under Section 35 U.S.C. 365 (c), under Section 35 U.S.C. 371 and under any other Section of the U.S.C. supporting such claim.

BACKGROUND OF THE INVENTION

1. Field of the Invention

The present invention relates to a heating control system where a set point is generated for controlling the temperature.

2. Brief Description of the Background of the Invention Including Prior Art

It has been conventional praxis to represent such set points as heating curves, where the heating curve is provided as a straight line extending from a point where the inside room feed temperature and the outside temperature are equal to up to a point where the maximum feed temperature of the heating plant is reached based on the minimum outside temperature. Such a straight heating curve is associated with the disadvantage that in the region of middle outside temperatures the set point of the feed line temperature is too low. This advantage can be corrected by shifting the heating curve parallel to itself in the direction of higher room temperatures. However, this results in an overheating of the room heated by the heating plant at lower outside temperatures. This again results in increased and wasted heat and energy use.

SUMMARY OF THE INVENTION

1. Purposes of the Invention

It is an object of the present invention to provide a set point for the hot fluid feed line temperature in a heating plant depending on the outside temperature, where the set point is independent of the set up of a controlled or of an automatic feedback controlled heating plant.

It is another object of the present invention to provide a heating system where the set point follows a curve which approximates closely the curve corresponding to a constant inside room temperature.

It is a further object of the present invention to provide a method for the generation of a set point value for an automatic feedback control or for a control of a heating plant, which provides a substantial approximation of the set point to the above mentioned curved, which is provided by a set point providing device.

It is yet another object of the present invention to provide a heating control system, where the system automatically adapts the set points, such that the automatic feedback controller can be switched on automatically.

It is yet a further object of the present invention to determine at an existing heating plant the end point of the heating curve, that is the value of $\theta_{Amin}$ of the minimum outside temperature, where the standard room set point temperature is to be reached at the maximum feed line temperature, and to set up such a relationship, which can be determined by conventional microcomputers without additional requirements.

It is an additional object to find the end point of the heating curve for a control of the feed line temperature or of a temperature derived therefrom depending on the outside temperature, that is to determine the value of $\theta_{Amin}$ of the minimum outside temperature at which the maximum feed line temperature is to be reached.

These and other objects and advantages of the present invention will become evident from the description which follows.

2. Brief Description of the Invention

The present invention provides a control method for a heating plant which comprises heating a fluid medium disposed in a heater, carrying the fluid medium from the heater to a heat exchanger provision via a feed line, and returning thermally depleted fluid medium from the heat exchanger to the heater via a return line. The temperature of the fluid medium is controlled along a sequence of two straight line sections in a diagram of outside temperature versus feed fluid medium temperature between a first end point where the outside temperature is equal to the fluid medium temperature in the feed line and a second end point where the minimum outside temperature corresponds to the maximum feed line temperature such that a third point on the curve for constant inside temperature between the said end points is connected with a straight line to each of the end points.

The third point is preferably selected on the nonlinear curve where the difference distance between a straight line from the first end point to the second end point and the nonlinear curve is a maximum when determined for each outside temperature state. The maximum of the difference distance can be determined according to the following equation:

$$\frac{\partial E}{\partial \theta_A} = -\alpha - \frac{1}{n}\psi(t)^{\frac{1}{n}-1} - \phi = 0 \quad (12)$$

The straight line connecting the first end point to the third point can have a slope angle $\alpha$, the straight line connecting the third point to the second end point can have a slope angle $\beta$, and the ratio $Q=\alpha/\beta$ of the two straight lines is selected according to the following relationship:

$$Q = \left(\frac{\theta_{RNS} - \theta_{VSTN}}{\theta_{Vmax} - \theta_{VSTN}}\right)\left(1 - n^{-\frac{n}{1-n}}\right) \quad (24)$$

There is further provided according to another aspect of the invention a control member for a heating plant which comprises heating a fluid medium disposed in a heater, carrying the fluid medium from the heater to a heat exchanger provision via a feed line, returning thermally depleted fluid medium from the heat exchanger to the heater via a return line, measuring the temperature of the heater, measuring the outside temperature, measuring the inside room temperature, automatically controlling the temperature of the fluid medium with the heat input of the heater based on the actual inside and outside temperature values, determining initially the deviation of the inside room temperature $\theta_{R-Act}$ from the room set point temperature $\theta_{R-set}$ and comparing the resulting difference with an adjustable threshold and the set point of the heating plant belonging to the inside room temperature $\theta_{R-set}$ is determined by shifting in parallel the heating curve according to the relationship $$\theta_{VST} = K = \theta_R$$

by the deviation of the values $\theta_{R\text{-set}} - \theta_{R\text{-Act}}$.

The relationship of the heating curve can be approximated by two straight lines which nmeet the following conditions:

$$\alpha = \frac{\theta_{VSTN} - \theta_{RNS}}{\theta_{ASTN} - \theta_{RNS}} \beta = \frac{\theta_{Vmax} - \theta_{VSTN}}{\theta_{Amin} - \theta_{ASTN}}$$

The relationship of the heating curve can be approximated by more than two straight lines where the end members meet the following conditions:

$$\alpha = \frac{\theta_{VSTN} - \theta_{RNS}}{\theta_{ASTN} - \theta_{RNS}} \beta = \frac{\theta_{Vmax} - \theta_{VSTN}}{\theta_{Amin} - \theta_{ASTN}}$$

There is further provided a control method for a heating plant which comprises heating a fluid medium disposed in a boiler, carrying the fluid medium from the boiler to a heat exchanger provision via a feed line, returning thermally depleted fluid medium from the heat exchanger to the heater via a return line, controlling the temperature of the fluid medium depending on the outside temperature along a curve meeting the following relationship $$\theta_V = \omega^{-\frac{1}{n}} \xi_t^{\frac{1}{n}} + \omega^{-1} \phi_t + \theta_R \quad (2)$$

where $\theta_V$ is the feed line temperature in degrees centigrade, $\omega$ is the difference between the room temperature set point value and the minimum outside temperature, n is the radiator coefficient, $\xi$ is the arithmetic medium value between the maximum feed line temperature and the maximum return line temperature decreased by the value of the room temperature set point, $\Phi$ is half the difference between the maximum value of the feed line temperature and the maximum value of the return line temperature, t is the difference between the actual room temperature and the outside temperature, and $\theta_r$ is the room temperature, where the temperature of the fluid medium is further defined by a relationship involving the room temperature and half the difference between the maximum value of the feed line temperature and the maximum value of the return line temperature.

The minimum outside temperature can be determined according to the following relationship:

$$\theta_{Amin} = \theta_{RNS} - \frac{\phi_t(1-n)}{(\theta_V - \theta_A) - nt \frac{\Delta\theta_V - \Delta\theta_R}{\Delta\theta_R - \Delta\theta_A}} \quad (32)$$

where
$\bar{\theta}_V$ is the average feed line temperature;
$\bar{\theta}_R$ is the average room temperature and $\Delta\theta_V$ is their difference.

The feed line temperature can be automatically controlled according to the following relationship:

$$\theta_V = \sqrt{\left(\frac{t}{\omega}\right)} \sqrt{\left(\frac{t}{\omega}\right)} \xi + \Phi\left(\frac{t}{\omega}\right) + \theta_R \quad (40)$$

The value of the maximum feed line temperature $\theta_{Vmax}$ starting from a measured pair of values as desired belonging to the minimum outside temperature can be determined for a feed line temperature resulting upon an actual value outside temperature according to the Newtonian iteration method.

There is also provided a control system for a heating plant which comprises a heater for a fluid medium, a feed line connected to the heater for carrying the fluid medium to a heat exchanger provision, a return line connected to the heat exchanger to receive thermally depleted fluid medium, a control unit for controlling the temperature of the fluid medium along a sequence of two straight line sections in a diagram of outside temperature versus feed fluid medium temperature between a first end point where the outside temperature is equal to the fluid medium temperature in the feed line and a second point where the minimum outside temperature corresponds to the maximum feed temperature such that a third point on the curve for constant inside temperature between the said end points is connected with a straight line to each of the end points.

The third point can be selected on the nonlinear curve where the difference distance between a straight line from the first end point to the second end point and the nonlinear curve is a maximum when determined for each outside temperature state. The maximum of the difference distance can be determined according to the following equation:

$$\frac{\partial E}{\partial \theta_A} = -\gamma - \frac{1}{n} \psi(t)^{\frac{1}{n}-1} - \phi = 0 \quad (12)$$

The straight line connecting the first end point to the third point can have a slope angle $\alpha$; the straight line connecting the third point to the second end point can have a slope angle $\beta$, the ratio $Q = \alpha/\beta$ of the two straight lines is selected according to the following relationship:

$$Q = \left(\frac{\theta_{RNS} - \theta_{VSTN}}{\theta_{Vmax} - \theta_{VSTN}}\right)\left(1 - n^{-\frac{n}{1-n}}\right) \quad (24)$$

The relationship of the heating curve can be approximated by two straight lines which meet the following conditions:

$$\alpha = \frac{\theta_{VSTN} - \theta_{RNS}}{\theta_{ASTN} - \theta_{RNS}} \beta = \frac{\theta_{Vmax} - \theta_{VSTN}}{\theta_{Amin} - \theta_{ASTN}}$$

There is provided in addition a control apparatus for a heating plant which comprises a boiler for a fluid medium, a feed line connected to the boiler for carrying the fluid medium to a heat exchanger provision, a return line connected to the heat exchanger to receive thermally depleted fluid medium, a control unit for controlling the temperature of the fluid medium depending on the outside temperature along a curve meeting the following relationship $$\theta_V = \omega^{-\frac{1}{n}} \xi_t^{\frac{1}{n}} + \omega^{-1} \phi_t + \theta_R \quad (2)$$

where $\theta_V$ is the feed line temperature in degrees centigrade, $\omega$ is the difference between the room temperature set point value and the minimum outside temperature, n is the radiator coefficient, $\xi$ is the arithmetic medium value between the maximum feed line temperature and the maximum return line temperature decreased by the value of the room temperature set point, $\Phi$ is half the difference between the maximum value of the feed line temperature and the maximum value of the return line temperature, t is the difference between the actual room temperature and the outside temperature, and $\theta_R$ is the room temperature, where the temperature of the fluid medium is further defined by a relationship involving the room temperature and half the difference between the the maximum value of the feed line temperature and the maximum value of the return line temperature.

The minimum outside temperature can be determined according to the following relationship:

$$\theta_{Amin} = \theta_{RNS} - \frac{\phi_t(1-n)}{(\theta_V - \theta_A) - nt \frac{\Delta\theta_V - \Delta\theta_R}{\Delta\theta_R - \Delta\theta_A}} \quad (32)$$

where
$\underline{\theta}_V$ is the average feed line temperature;
$\theta_R$ is the average room temperature and $\Delta\theta_V$ is their difference.

A control apparatus for a heating plant according to claim 17 wherein the feed line temperature can be automatically controlled according to the following relationship:

$$\theta_V = \sqrt{\left(\frac{t}{\omega}\right)}\sqrt{\left(\frac{t}{\omega}\right)} \xi + \phi\left(\frac{t}{\omega}\right) + \theta_R \quad (40)$$

The feed line temperature can be automatically controlled according to the following relationship: where the value sof the maximum feed line temperature $\theta_{Vmax}$ starting from a measured pair of values as desired belonging to the minimum outside temperature is determined for a feed line temperature resulting upon an actual value outside temperature according to the Newtonian iteration method.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
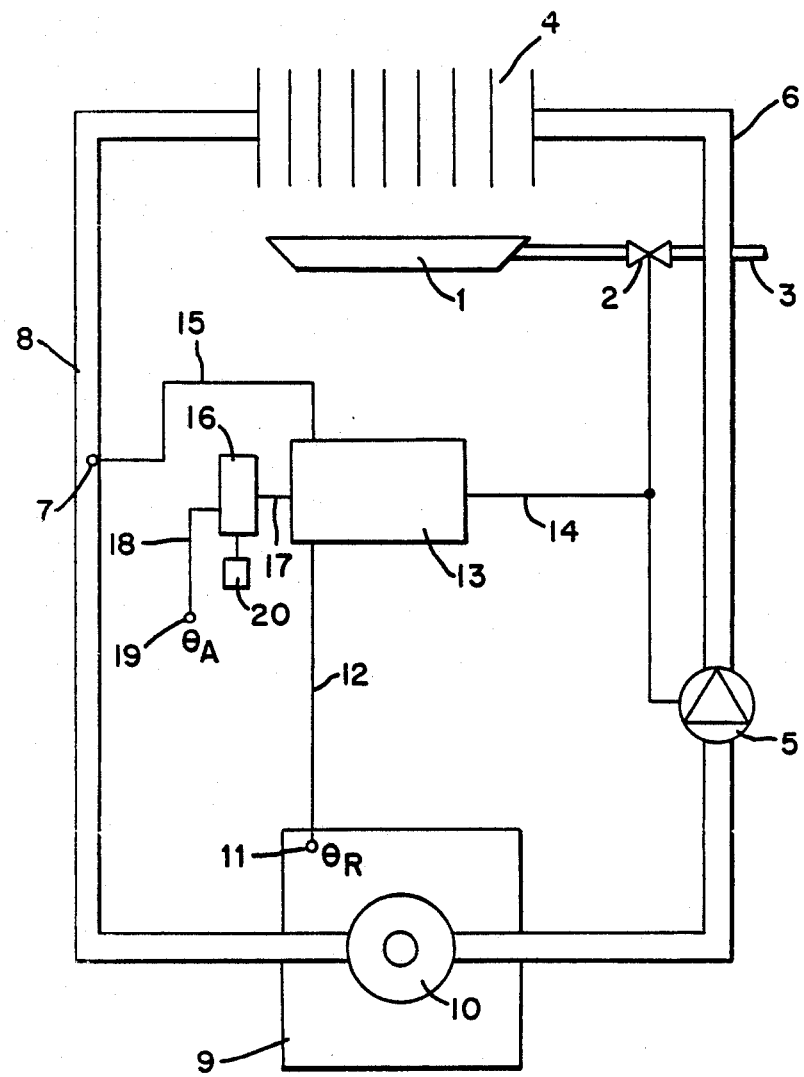
FIG. 1 is a view of a schematic circuit representation of an automatic feedback temperature control heating plant.

In accordance with the present invention there is provided a method for the formation of the set point of a control provision or, respectively, automatic feedback control provision for the hot feed line temperature of a heating plant depending on the outside temperature and employing a linear relationship between the feed line temperature and the outside temperature and a non-linear relation between these parameter values deviating from the linear relation, where the end points of this relation at a minimum outside temperature are defined by a maximum hot feed line temperature on the one hand and by an equal outside and feed line temperature on the other hand. The improvement comprises that a point 28 between the two end points 26, 27 is determined on the non-linear curve relationship 23 and that this point is connected to the end points by a respective line 24, 25 of different slope representing an approximation to the nonlinear relationship.

Preferably the point 28 is placed where the deviation 29 between the linear 22 and nonlinear relationship 23 is a maximum as determined for each outside temperature. The deviation (29) can be determined according to the following equation:

$$\frac{\partial E}{\partial \theta_A} = -\alpha - \frac{1}{n} \psi(t)^{\frac{1}{n}-1} - \phi = 0 \quad (12)$$

The ratio Q of the angles $\alpha$, $\beta$ of the two straight lines 24, 25 can be chosen according to the following equation:

$$Q = \left(\frac{\theta_{RNS} - \theta_{VSTN}}{\theta_{vmax} - \theta_{VSTN}}\right)\left(1 - n^{-\frac{n}{1-n}}\right) \quad (24)$$

The set point value for the feed line temperature of a heating plant is to be set depending on the outside temperature and the set point value is to be independent on the control or automatic control of the plant. The accurate function of the set point value of the feed line temperature as a function of the outside temperature can be determined according to the following formula (1):

$$\theta_{V23} = \frac{\frac{\theta_{Vmax} + \theta_{RLmax}}{2} - \theta_{RNS}}{(\theta_{RNS} - \theta_{Amin})^{1/n}} (\theta_R - \theta_A)^{\frac{1}{n}} + \tag{1}$$

$$\frac{\frac{\theta_{Vmax} + \theta_{RLmax}}{2} -}{(\theta_{RNS} - \theta_{Amin})} (\theta_R - \theta_A) + \theta_R$$

The feed line temperature set point value in degrees centigrade is here designated as $\theta_V$, the maximum feed line temperature as $\theta_{Vmax}$, the maximum return line temperature as $\theta_{RLmax}$, the standard room set point temperature as $\theta_{RNS}$, the room set point temperature as $\theta_R$, the minimum outside temperature as $\theta_{Amin}$, the outside temperature as $\theta_A$ and n is a radiator coefficient. The radiator coefficient n is a parameter without physical dimension and it takes the heat dissipation of the radiator depending on temperature into consideration.

Based on the exponential value occurring in equation (1) it is not possible for a standard automatic feedback controller to process these formulas immediately, since this results in an untenable expenditure requirement.

After the assembly of a heating plant and the automatic feedback control for the heating plant there remains the task to initially set up and adjust the control or automatic control provision. The present invention provides for the possibility of an automatic adaptation such that the controller can turn on automatically. Once the adaptation has bee performed, then the controller continues to work automatically according to the setting provided.

According to one aspect of the invention, the dependence of the value of a temperature of a heating plant with a heat source, a user provision and an automatic feedback control circuit can be optimized where the measurement devices and sensors capture the same temperature of the heating plant, the outside and the inside room temperature as actual values. The heat source is adjusted in its output. If the dependence of the temperature of the heating plant onthe outside temperature is arbitrary, then initially the deviation of the inside room temperature $\theta_{R\text{-}act}$ from the set point of the inside room temperature $\theta_{R\text{-}set}$ is determined and compared with an adjustable threshold and the set point of the temperature of the heating plant, which corresponds to the inside room set point temperature $\theta_{R\text{-}set}$ is found by shifting the heating curve in parallel according to the relationship $$\theta_{VST} = K + \theta_R$$

parallel by the deviation of the values $\theta_{R\text{-}set}$ minus $\theta_{R\text{-}act}$. The relation of the heating curve can be approximately be several and in particular by two straight lines, which meet the following condition $$\alpha = \frac{\theta_{VSTN} - \theta_{RNS}}{\theta_{ASTN} - \theta_{RNS}} \beta = \frac{\theta_{Vmax} - \theta_{VSTN}}{\theta_{Amin} - \theta_{ASTN}}$$

According to a further application of the invention the starting point can be an existing heating plant, where the operation is to be optimized. It is known that the feed line temperature of the heating plant can be controlled depending on the standard room temperature set point, the maximum feed line temperature, the maximum return line temperature, the room temperature, the outside temperature and the radiator coefficient according to the equation $$\theta_V = \omega^{-\frac{1}{n}} \xi t^{\frac{1}{n}} + \omega^{-1} \phi t \theta + \theta_R \tag{2}$$

where $\theta_V$ is the feed line temperature in degrees centigrade,
ω is the difference between the room temperature set point value and the minimum outside temperature, n is the radiator coefficient, ξ is the arithmetic medium value between the maximum feed line temperature and the maximum return line temperature decreased by the value of the room temperature set point, Φ is half the difference between the maximum value of the feed line temperature and the maximum value of the return line temperature, t is the difference between the actual room temperature and the outside temperature, and
$\theta_R$ is the room temperature. The minimum outside temperature can be determined according to the following relationship:

$$\theta_{Amin} = \theta_{RNS} - \frac{\phi t (1 - n)}{(\theta_V^- - \theta_A^-) - n t \frac{\Delta \theta_V - \Delta \theta_R}{\Delta \theta_R - \Delta \theta_A}} \tag{32}$$

where
$\overline{\theta_V}$ is the average feed line temperature;
$\overline{\theta_R}$ is the average room temperature and $\theta_V$ is their difference.

A method for controlling the feed line temperature or of a parameter depending on the feed line temperature can depend on the outside temperature according to equation (2) and its parameters as set forth above in a heating plant and the feed line temperature can be controlled according to the following equation (40):

$$\theta_V = \sqrt{\left(\frac{t}{\omega}\right)} \sqrt{\left(\frac{t}{\omega}\right)} \xi + \phi \left(\frac{t}{\omega}\right) + \theta_R \tag{40}$$

Alternatively, in the method employing equation (2) the value of the maximum feed line temperature $\theta_{Vmax}$ belonging to the minimum outside temperature is determined starting with a measured arbitrary pair of values for which a feed temperature resulting from an actual outside temperature is determined by application of the Newtonian iteration method.

The maximum power of the heat source of a heating plant is determined generally by a heat consumption and requirement calculation. Here the minimum outside temperature $\theta_{Amin}$ is fixed, where the standard room set point temperature still can be reached based on the power of the heat source. In many cases heating plants are overdimensioned relative to their power and this means that in a control for the heating plant depending on the outside temperature in general a heating curve is used, which does not agree with the heating curve to be implemented.

The heating curve is defined by its starting point, where feed line temperature, room temperature, and outside temperature are equal, and by its end point, where the maximum possible feed line temperature has to be reached at a minimum outside temperature. Therefore, since the starting point is fixed and the end point is obtained according to the present invention, then the right heating curve can be found by measurement of a few points of the curve, but by at least two points.

A heat source such as a burner 1 is provided in the heating plant according to FIG. 1, which is fed via a fuel feed line 3 furnished with a solenoid valve 2. The solenoid valve 2 can operate in a clocked cycle or a proportionally controlled valve can be employed. The burner 1 heats a heat exchanger 4, to which a return line 6 with a pump is connected for delivering heating water. The heated water is taken off via a feed line 8 furnished with a feed line temperature sensor 7. Feed and return line run to a chamber 9, where at least one heat exchanger or radiator 10 is present, which is connected to the feed and return line. A sensor 11 for the temperature $\theta_R$ of the room is disposed in the room and the sensor 11 is connected to an automatic feedback controller 13 via a measurement line 12. The automatic feedback controller operates via an output line 14 the solenoid valve 2 and the electrical drive motor of the pump 5. The value signals passing via line 14 thus represent the correcting variables of the automatic feedback controller 13. In addition, a reference input element 16 is provided, which is connected via line 17 to the automatic feedback controller 13. A temperature sensor 19 for the outside temperature $\theta_A$ is connected to the reference input element 16 via a line 18. Furthermore, a set point adjuster 20 is provided, which can be formed as a handle. According to this controlled heating plant the feed line temperature is measured by the sensor 7 and the gas solenoid valve 2 is adjusted by the automatic feedback controller 13. The control command variable for the set point is substantially the outside temperature, which is entered via the sensor 19 into the reference input element 16. Since the control signals of line 14 is supervised by a measurement device 7, this embodiment relates to an automatic feedback control provision.

Figure 2:
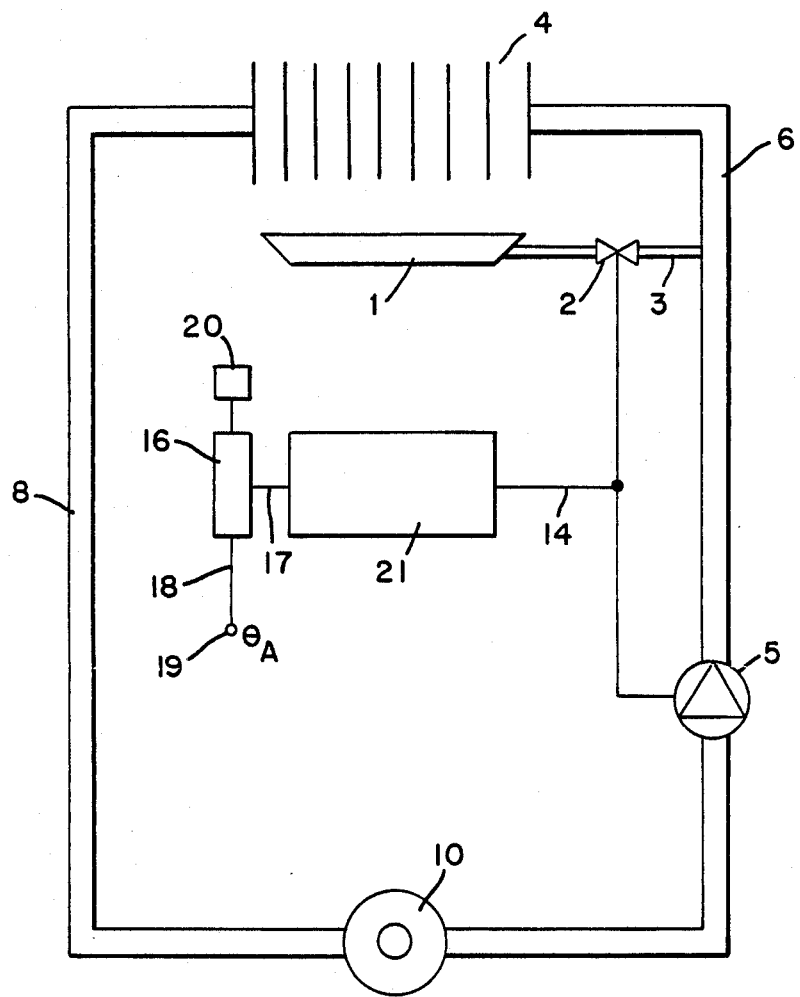
FIG. 2 is a view of a schematic circuit representation of a controlled temperature heating plant

The embodiment of FIG. 2 comprises a control provision 21 as a central unit, which transmits its set points as in the previous embodiment to the gas solenoid valve 2 and to the drive motor of the pump 5. A handle 20 for manual setting is provided at the reference input element 16 as well as the sensor 19 for the outside temperature. A sensor for the feed line temperature is missing. This heating plant operates as a simple control, since the input of the reference value does not include a connection to a sensor for the actual value.

The present invention provides in particular to enter into the reference input element a relationship according to which the feed line temperature is controlled or automatically feedback controlled depending on the outside temperature.

Figure 3:
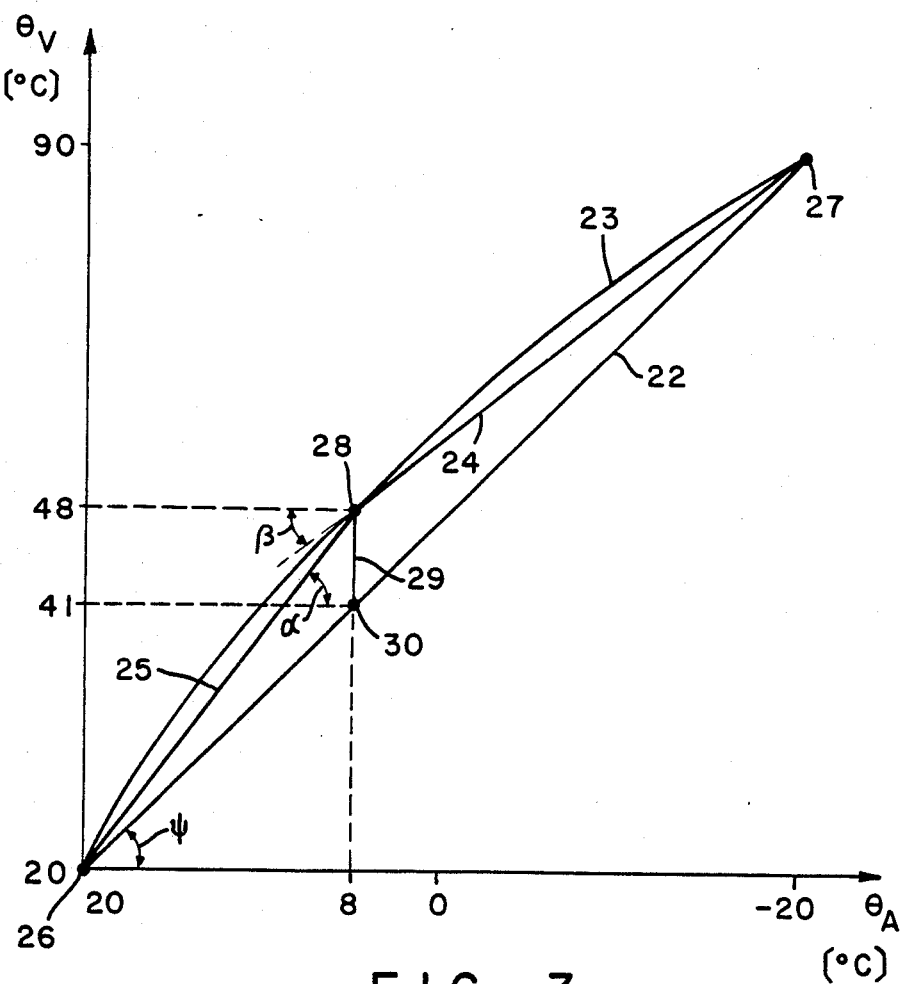
FIG. 3 is a view of a diagram illustrating the temperature of the feed line versus the outside temperature.

To describe the invention in detail reference is made to FIG. 3. FIG. 3 shows a diagram, where the outside temperature $\theta_A$ in degrees centigrade is placed on the absicca from 20 to $-20$ degrees centigrade and the ordinate represents the feed line temperature from 20 to 90 degrees centigrade. Several relationship curves 22, 23, 24, 25 result, where the relationship 22 illustrates a straight line, which is regularly designated as heating curve. Thus the heating curve 22 is a straight line, which extends from the intersection point of the coordinates to the maximum load point. The coordinate intersection point represents the point where the outside temperature $\theta_A$, the feed line temperature $\theta_V$ and the room temperature show the same temperature, which is here 20 degrees centigrade. This point is designated as 26. The point 27 represents that point, where at the lowest settable outside temperature the maximum feed line temperature of the heating plant is reached. According to the embodiment the maximum feed line temperature of 90 degrees centigrade is reached at an outside temperature of $-20$ degrees centigrade. However, it is possible to select here other dependencies. For example, if the heating plant according to FIG. 1 or 2 is placed at a climatically very unfavorable location, where $-30$ degrees centigrade can be reached, then it is possible to coordinate this outside temperature value for example to a feed line temperature of 110 degrees centigrade. Then the point 27 would be correspondingly shifted. The same holds for floor heating systems in a climatically favorable region, where for example a feed line temperature of 40 degrees centigrade is coordinated to a minimum outside temperature of 31 5 degrees centigrade. While the straight line 22 represents the shortest connection of the points 26 and 27, the curved line 23 represents the proper heating curve according to the relationship one. A consideration of the curves 22 and 23 shows that they deviate from each other and the curve 22 represents in a certain sense a chord or subtense of the curve 23.

The invention enters at this point and is based on the recognition that the deviation of the two curves, in each case as it relates to the actual outside temperature, represents the error amount size by which the set point is provided wrong for the control or automatic feedback control system. For example, if one selects a point 28 in a middle region on the curved line 23, then the line 29, which is the vertical of the point 28 to the intersection point with the heating curve 22 at the point 30, represents the error amount, by which the set point of the control or automatic feedback control provision is provided wrong. It has been found that the point 28 can be connected both to the point 26 with a straight line 25 as well as to the point 27 with a straight line 24. The set points can be provided according to part straight lines 24 and 25. This means that the error of the set point as compared to the straight line 22 is decreased. An optimum decrease of the error occurs then when the point 28 is selected there where the set point error is largest, that is where the distance length of the line 29 has a maximum.

The point 28 is based on a feed line temperature value $\theta_V$ of 48 degrees centigrade and on an outside temperature of 8 degrees centigrade. The outside temperature value is also at 8 degrees centigrade at the point 30 and the feed line temperature value at 41 degrees centigrade. The straight lines 24 and 25 form angles $\alpha$ and, respectively, $\beta$, which stand in a relationship to each other and to the horizontal, which will be described in more detail below.

Figure 4:
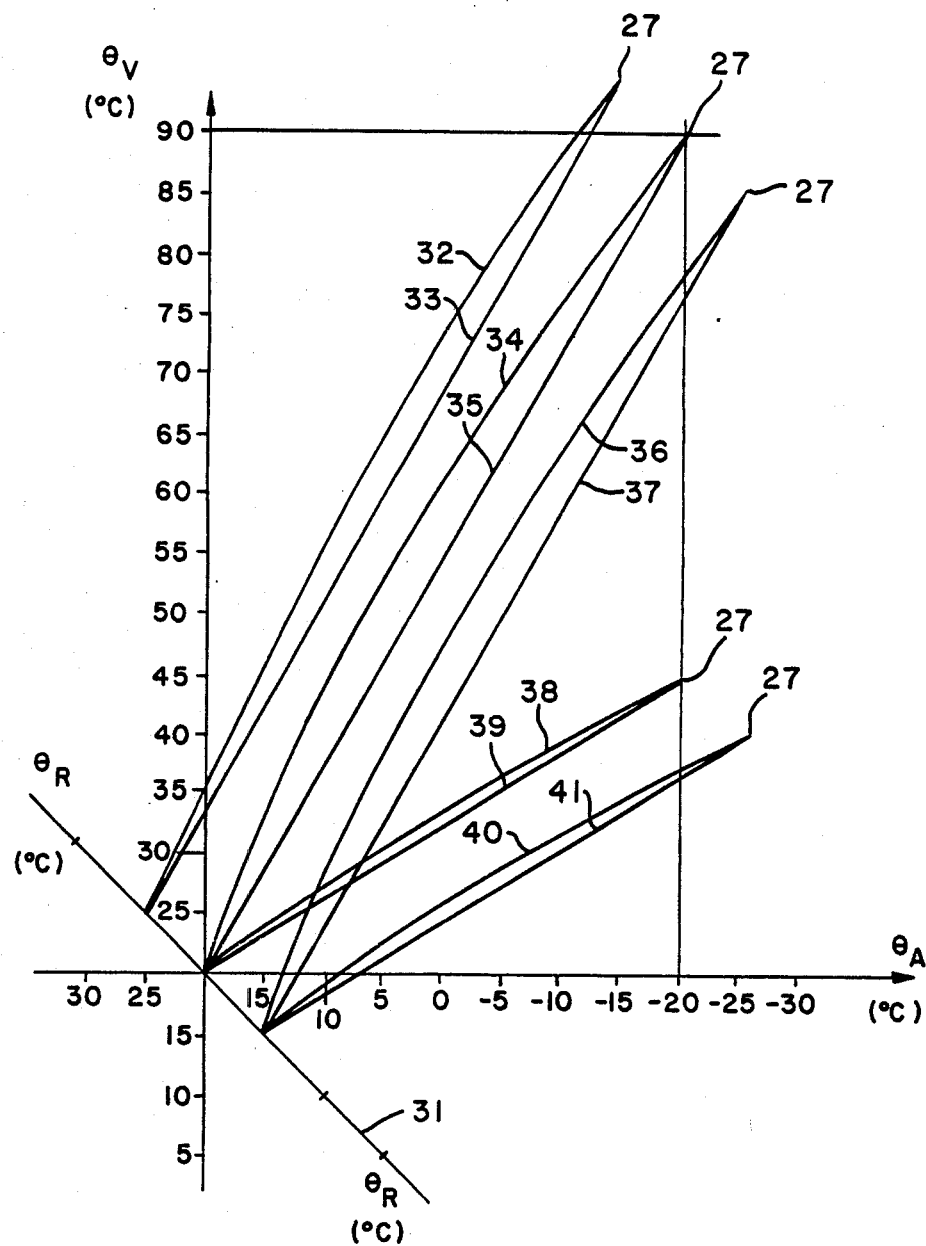
FIG. 4 is a view of a diagram illustrating a sequence of curves plotted for parameters representing room temperature.

FIG. 4 again shos a diagram which indicates the dependence of the feed line temperature on the outside temperature, where in addition also the room temperature $\theta_R$ is plotted in degrees centigrade. From this results in addition that the point 27 can be freely selected. While in a radiator heating system the upper regions can be freely selected, lower lying regions are selected according to a floor heating system. Equation (3) is the starting point for the further consideration.

$$\theta_{V23} = \frac{\frac{\theta_{Vmax} + \theta_{RLmax}}{2} - \theta_{RNS}}{(\theta_{RNS} - \theta_{Amin})} (\theta_R - \theta_A)^{\frac{1}{n}} + \quad (3)$$

$$\frac{\frac{\theta_{Vmax} + \theta_{RLmax}}{2} - \theta_{RNS}}{(\theta_{RNS} - \theta_{Amin})} (\theta_R - \theta_A) + \theta_R$$

This equation corresponds to the curve 23 of FIG. 3. The curve 22 of FIG. 3 is represented by equation 4.

$$\theta_{V22} = \frac{\theta_{Vmax} - \theta_{RNS}}{(\theta_{Amin} - \theta_{RNS})} (\theta_A - \theta_R) + \theta_R \quad (4)$$

Since the distance 29 represents the largest possible deviation between the two curves, the two equations are to be subtracted from each other for determination of the maximum of distance 29. In order to keep the equations orderly and easy to survey, the following initial simplifications are performed: The abbreviated nomenclature of equations (5) and (6) is introduced in equation (4) and results in equation (7):

$$t = \theta_R - \theta_A \quad (5)$$

$$\gamma = \frac{\theta_{Vmax} - \theta_{RNS}}{\theta_{Amin} - \theta_{RNS}} \quad (6)$$

$$\theta_{V22} = -\gamma t + \theta_R \quad (7)$$

Starting with equation (3) simplfications are performed according to the equations (8) and (9).

$$\psi = \frac{\frac{\theta_{Vmax} + \theta_{RLmax}}{2} - \theta_{RNS}}{(\theta_{RNS} - \theta_{Amin})} \quad (8)$$

$$\phi = \frac{\frac{\theta_{Vmax} + \theta_{RLmax}}{2}}{(\theta_{RNS} - \theta_{Amin})} \quad (9)$$

Equation (3) simplifies to equation (10) iunder consideration of the equations (8) and (9).

$$\theta_{V23} = \psi (t)^{1/n} + \phi (t) + \theta_R \quad (10)$$

Now equations (8) and (10) are subtracted from each other such that equation 11 results:

$$E = \psi_{(t)}^{1/n} + \phi_{(t)} + \theta_R + \gamma t - \theta_R \quad (11)$$

The derivative of dE to d$\theta_A$ is to be formed according to equation (12) such that the distance 29, that is this difference, becomes a maximum according to equation (11). This differential quotient is to be set equal to zero:

$$\frac{\partial E}{\partial \theta_A} = -\gamma - \frac{1}{n} \psi (t)^{1/n - 1} - \phi = 0 \quad (12)$$

The values of the equations (5), (6), (8) and (9) are inserted and the equation thus obtained is resolved for $\theta_A$. The result is equation (13).

$$\theta_{AST} = \theta_R - n^{n/(1-n)} (\theta_{RNS} - \theta_{Amin}) \quad (13)$$

This equation means that the maximum deviation between the curves 22 and 23 depends on the room temperature $\theta_R$ and a product is formed of the radiator coefficient and the difference between the room standard temperature and the minimum outside temperature. Now the expression for $\theta_{AST}$ determined according to equation (13) is inserted into equation (3), and in fact in place of $\theta_A$. Thus equation (14) results.

$$\theta_V = \frac{\omega}{\xi^{\frac{1}{n}}} \left( \theta_R - \left( \theta_R - \left( \frac{n \xi^{1/n}}{\omega} \left( \frac{\theta_{Vmax} - \theta_{RNS}}{\xi} - \frac{\phi}{\xi} \right) \right)^{n/(n-1)} \right)^{1/n} \right) + \frac{\phi}{\xi} \left( \theta_R - \left( \theta_R - \left( \frac{n \xi^{1/n}}{\omega} \left( \frac{\theta_{Vmax} - \theta_{RNS}}{\xi} - \frac{\phi}{\xi} \right) \right)^{1/(1-n)} \right) \right) + \theta_R \quad (14)$$

Simplfications according to the equations (15) to (17) have been introduced here.

$$\omega = \frac{\theta_{Vmax} + \theta_{RLmax}}{2} - \theta_{RNS} \quad (15)$$

$$\phi = \frac{\theta_{Vmax} - \theta_{RLmax}}{2} \quad (16)$$

$$\xi = \theta_{RNS} - \theta_{Amin} \quad (17)$$

Equation (18) is obtained by simplification and reforming of equation (14).

$$\theta_{VST} = \quad (18)$$

$$n^{n/(1-n)} \left( \frac{n+1}{2} \theta_{Vmax} + \frac{n-1}{2} \theta_{RLmax} - n\theta_{RNS} \right) + \theta_R$$

The first expression in equation (18) can be replaced by a constant K according to equation (19):

$$K = n^{n/(1-n)} \left( \frac{n+1}{2} \theta_{Vmax} + \frac{n-1}{2} \theta_{RLmax} - n\theta_{RNS} \right) \quad (19)$$

The equation (18) is thereby simplified to equation (20):

$$\theta_{VST} = K + \theta_R \quad (20)$$

This means that the support temperature, that is the ordinate value of the point 28 in FIG. 3, does vary only with the change in room temperature.

This realization opens up to the possibility of fixation of the point 27 based on the selection of a room temperature desired by the user, that is the fixation of the coordinate values of the point 26, and the construction of the heating plant, that is the coordination of a maximum feed line temperature $\theta_{Vmax}$ to a minimum outside temperature $\theta_{Amin}$. Since the point 28 can be determined according to equation (20) as the constant K depends only on the values just mentioned and the radiator coefficient n, the point 28 is fixed relative to its coordinates upon selection of the heating plant and of the desired room temperature. This allows to set up the equations for the straight lines 24 and 25. The straight line 25 is defined by equation (21): (21)

$$\alpha = \frac{\theta_{VSTN} - \theta_{RNS}}{\theta_{ASTN} - \theta_{RNS}} \quad (21)$$

The starting point is here that the room temperature $\theta_R$ is equal to the room standard set point temperature $\theta_{RNS}$. If this is not the case, then all values are shifted parallel to the curves 22 and 23. The shift has to be performed according to the curve 31 in FIG. 4. The equation (22) holds for the part section of straight line 24.

$$\beta = \frac{\theta_{Vmax} - \theta_{VSTN}}{\theta_{Amin} - \theta_{ASTN}} \quad (22)$$

If the quotient of equations (21) and (22) is formed, then in a sense the slope ratio of the straight lines is imaged by equation (23).

$$Q = (\alpha/\beta) \quad (23)$$

If the values of equation (13) are entered into equation (23) then the result is equation (24).

$$Q = \left(\frac{\theta_{RNS} - \theta_{VSTN}}{\theta_{Vmax} - \theta_{VSTN}}\right)(1 - n^{-n/(1-n)}) \quad (24)$$

If the heating system engineer is faced with the task to set the control 21 or, respectively, the automatic feedback control 13 relative to the set point input data, then initially the desired room temperature is entered into the reference input element 16 and the coordination of the maximum feed line temperature $\theta_V$ to the minimum outside temperature to be expected. Thus the points 26 and 26 are immediately fixed in the reference input element 16. In addition, the coordinates of the point 28 are fixed according to equation (18) or, respectively, (19). Since the connections of the three points among each other are represented by straight lines, three linear functions are formed in the reference input element 16, which correspond to the equations (21) and (22), whereby the position of the straight lines 24 and 25 is fixed. The angle is described over the value of the equation (24), which is formed by the two straight lines 24 and 25 at the point 28. This means the position of the straight lines 25 could be set in the reference input element by connecting of points 26 and 28 and then the position of the straight line 24 from point 28 via the input of the values according to equation (24). Since here linear relationships are concerned, these relationships are eminently suited as input for a microprocessor, since here the programming is possible with a comparatively low expenditure.

It is to be pointed out that the circuit for the entry of the functions is not dependent on the use of a microprocessor and the respective relationships can also be represented by conventional building elements.

It can be recognized from equation (20) that the sensing and measurement of the room temperature is useful for the time adjustment of the reference input element. The room temperature sensor 11 is provided for this purpose in the embodiment. However, if one enters a certain room temperature as a set point value, then in principle one can also work without a room temperature sensor, which was performed in the embodiment according to FIG. 2.

The invention has been described so far under the precondition that certain values for the maximum feed line temperature $\theta_{Vmax}$ and the minimum outside temperature $\theta_{Amin}$ as well as the room temperature of 20 degrees centigrade are predetermined. The curves 32 to 40 can now be recognized in FIG. 4, which curves are generated if one deviates from a certain value of the maximum feed line temperature or, respectively, if different values are set for the room temperature. The equations (19), (20) and (24) however have been developed for arbitrarily selectable values of the maximum feed line temperature, the minimum outside temperature and the room temperature. The curves 33, 35, 39 and 41 represent equivalents to the heating curve 22, while the curved lines 32, 34, 36, 38 and 40 represent equivalents to the curved heating curve 23. The straight pieces 24 and 25 or, respectively, the equivalents corresponding to them are not entered in FIG. 4 for reasons of maintaining a relative simple diagram.

Figure 5:
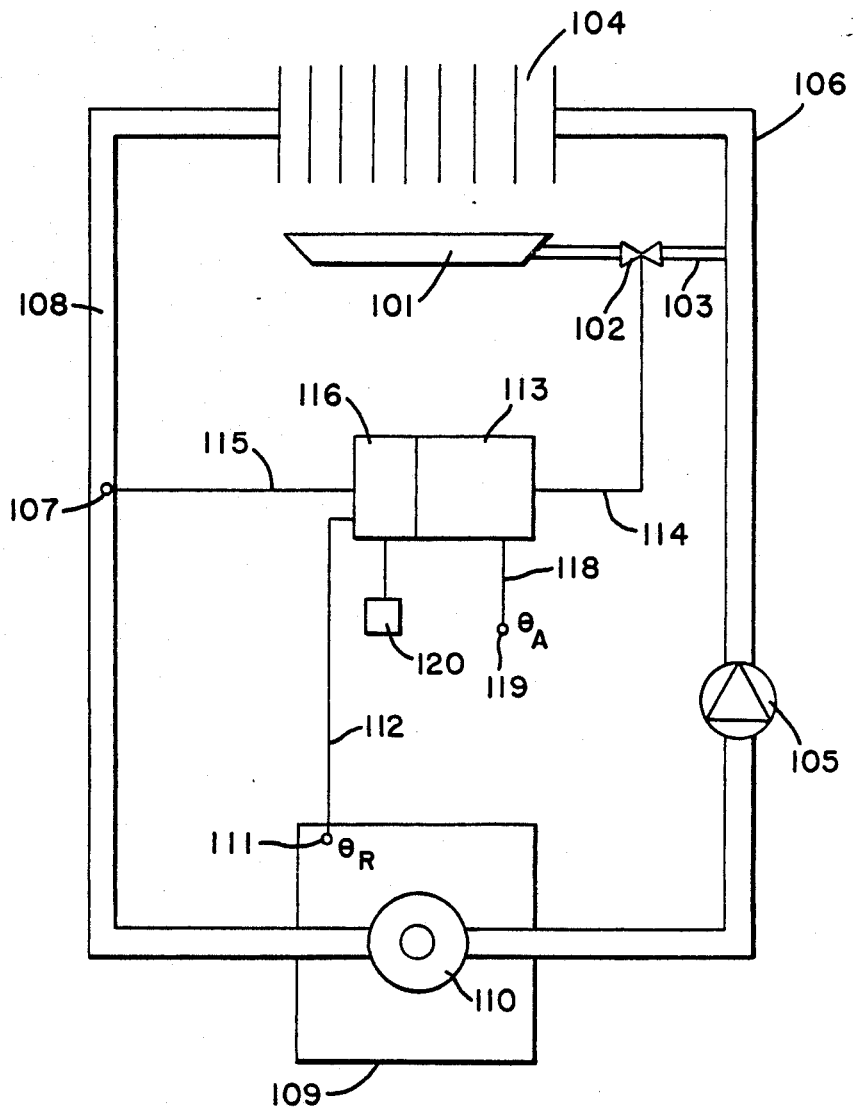
FIG. 5 is a view of a schematic diagram of a heating plant with a corresponding automatic feedback control system.

A heat source formed as a burner 101 is provided at the heating plant according to FIG. 5 and the burner is fed by a fuel line 103 furnished with a solenoid valve 102. The solenoid valve 102 can operate according to a clock cycle, alternatively a proportionally controlled valve can be employed. The burner 101 heats a heat exchanger 104, to which water for heating is fed via a return line 106 provided with a pump 105 and the heated water is fed away via a feed line 108 provided with a feed line temperature sensor 107. The feed line and the return line run to a room 109, where at least a radiator or heating element 110 is present, which is connected to the feed and return line. A sensor 111 for the room temperature $\theta_R$ is disposed in the room and is connected via a detector line 112 to the automatic feedback controller 113. The automatic feedback controller controls the solenoid valve 102 via an output line 114 and the electrical drive motor not further illustrated here of the pump 105. The values passing over line 114 thus represent the set point values for the automatic feedback controller. The feed line temperature sensor 107 is connected to the automatic feedback controller 113 via a detector signal line 115. In addition, a reference input element 116 is provided, which is connected to the automatic feedback controller 113. A sensor 119 for the outside temperature $\theta_A$ is connected to the reference input element 116 via a line 118. Furthermore, a set point manipulator 120 is provided, which can be provided as a handle or as a knob. The feed line temperature is measured by the sensor 107 in this automatic controlled heating plant. The gas solenoid valve 102 is adjusted by the controller 113. The outside temperature $\theta_A$ is substantially the command control variable, which is entered into the reference input element 116 via the sensor device 119. Since the control signals passing over line 114 are controlled by a sensor 107, this embodiment is concerned with an automatic feedback control system.

Figure 6:
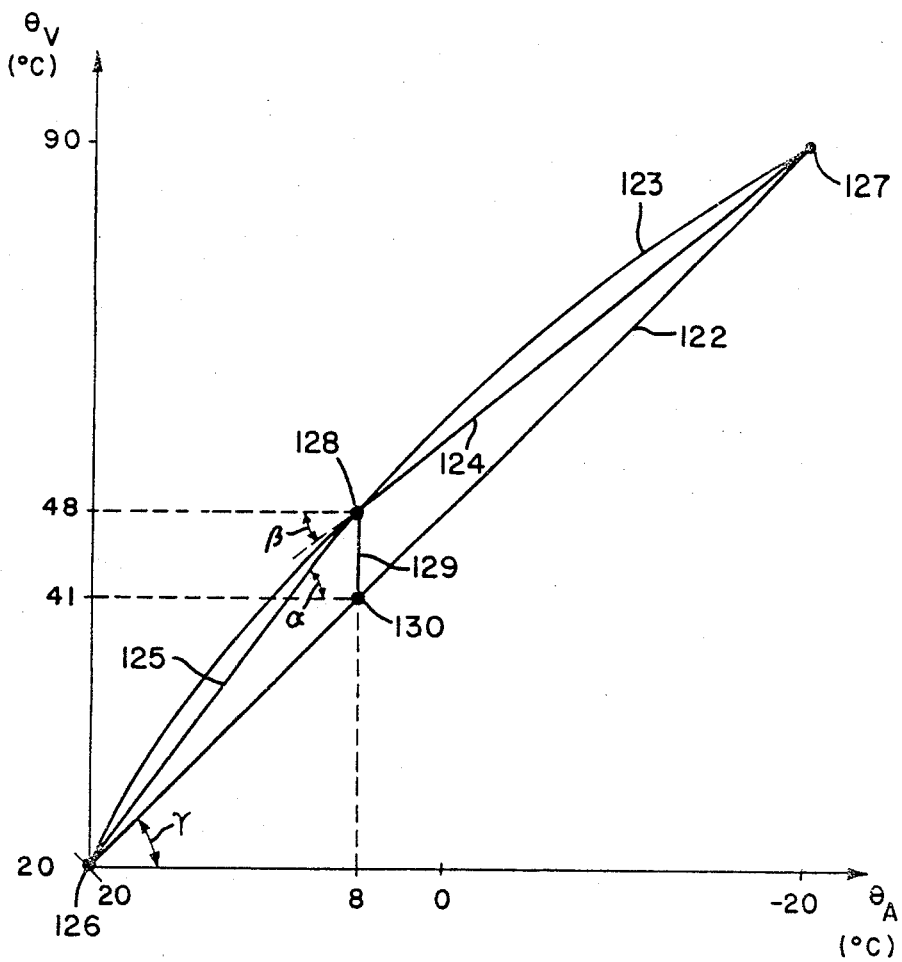
FIG. 6 is a view of a diagram similar to FIG. 3 illustrating the temperature of the feed line versus the outside temperature.

In order to process the heating curve better for automatic adaptation, the in reality curved heating curve is approximated by two straight lines according to equation (1), where reference is made to FIG. 6.

$$\theta_{V23} = \frac{\frac{\theta_{Vmax} + \theta_{RLmax}}{2} - \theta_{RNS}}{(\theta_{RNS} - \theta_{Amin})} (\theta_{R1/n} - \theta_A)^{\frac{1}{n}} + \quad (1)$$

$$\frac{\frac{\theta_{Vmax} + \theta_{RLmax}}{2}}{(\theta_{RNS} - \theta_{Amin})} (\theta_R - \theta_A) + \theta_R$$

FIG. 6 shows a diagram where on an abscissa the outside temperature $\theta_A$ is plotted in degrees centigrade from 20 to −20 degrees, while the ordinate indicates the feed line temperature from 20 to 90 degrees centigrade. There are several relationships 122, 123, 124, and 125, where the relation 122 represents the straight line, which is regularly designated as the heating curve. The straight line 122 is thus a linear curve, which extends from the coordinate intersection point to the maximum load point of the heating plant. The coordinate intersection point represents the point where the outside temperature $\theta_A$, the feed line temperature $\theta_V$ and the room temperature are provided with the same value, which is here 20 degrees centigrade. This point is designated as 126. The point 127 represents a point where the maximum feed line temperature of the heating plant is reached at the lowest settable outside temperature. The embodiment reaches the maximum feed line temperature of 90 degrees centigrade at an outside temperature of −20 degrees centigrade. It is certainly possible to select other types of dependencies. In case the heating plant according to FIGS. 5 and 6 is placed for example at a climatically very unfavorable location, where an outside temperature of −30 degrees centigrade can be reached, then it is possible to coordinate to this outside temperature value for example a feed line temperature of 110 degrees centigrade. Accordingly, the point 127 would experience a corresponding shift. The same holds for floor heating systems in a climatically favorable region, where for example a feed line temperature of 40 degrees centigrade is coordinated to a minimum outside temperature of −5 degrees centigrade. The curved line 123 represents the proper accurate heating curve according to the equation (1), while the straight line 122 represents the shortest connection of the points 126 and 127. A consideration of the curves 122 and 123 shows that these curves deviate from each other, and the curve 122 in a certain sense forms a chord with respect to curve 123.

The invention enters at this point and starts with the recognition that the deviation of the two curves, in each case with reference to the actual outside temperature, represents an error amount value by which the set point for the controller or for the automatic feedback controller is entered defectively. If one selects for example on the curved line 123 a point 128 in a middle region, then the distance length 129, which is the vertical of the point 128 to the intersection with the heating curve 122 at the point 130, represents the error by which the set point is entered wrongly into the control or automatic feedback control provision. It was now found that one can connect the point 128 both to the point 126 with a straight line 125 as well as to point 127 with a straight line 124 and the set points of the two part straight lines can be predetermined. This means that the error of the set point is decreased relative to that of the straight line 122. An optimum decrease of the error is achieved if the point 128 is selected there where the set point error is largest, that is where the distance length of the line 129 has a maximum.

The point 128 is based on feed line temperature value $\theta_V$ of 48 degrees and an outside temperature value of 8 degrees. The outside temperature value equally is at 8 degrees at the point 130 and the feed line temperature value is 41 degrees centigrade. The straight lines 124 and 125 form angles α and β, which have a relationship to be described in more detail below with respect to each other and to the horizontal.

Figure 7:
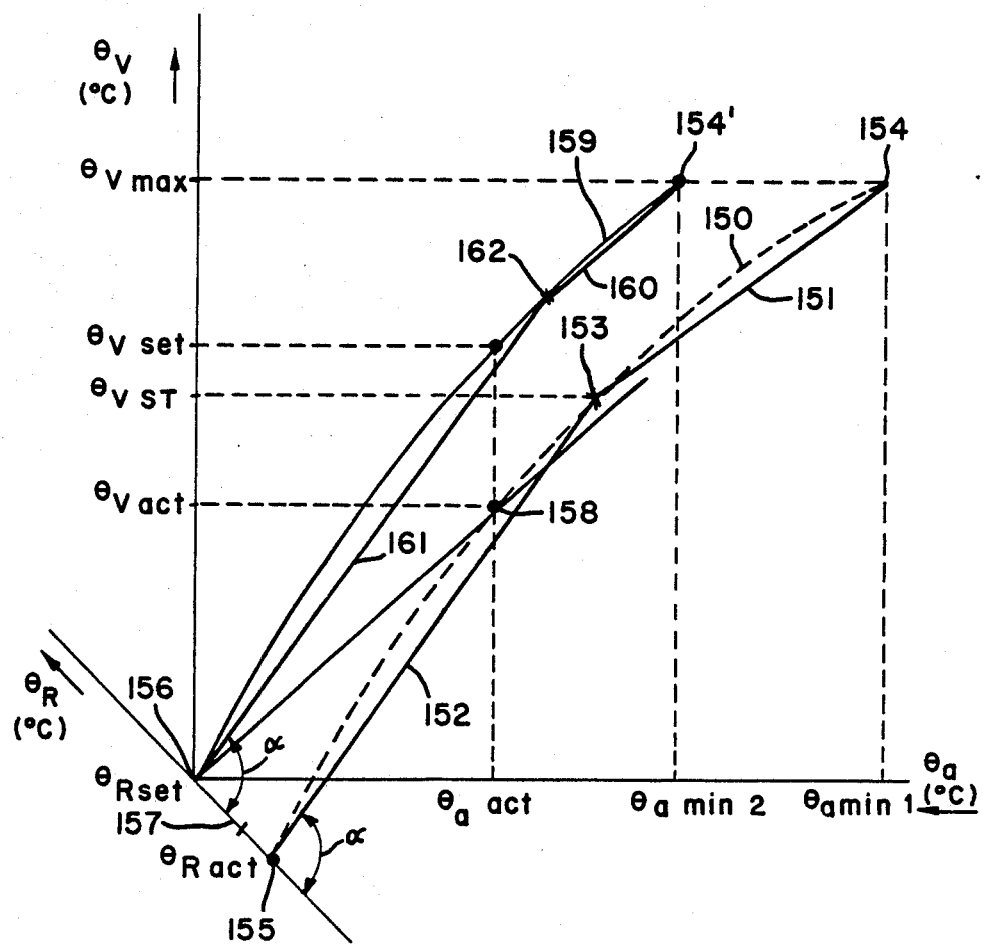
FIG. 7 is a view of a diagram illustrating a sequence of curves plotted for parameters representing room temperature.

In order to apply the first self-adjustment of the automatic feedback controller reference is made to FIG. 7. The outside temperature $\theta_A$ is plotted on the abscissa of FIG. 7 and the ordinate represents the feed line temperature $\theta_V$. The room temperature $\theta_R$ moves at an angle of 45 degrees respect to the two other ones. The dimensional unit for all three dimensions is degrees centigrade. Instead of working with the feed line temperature incidentally one can just as well operate with the return line temperature or with a mixed temperature derived from the feed line temperature and/or the return line temperature.

The heating plant is heated up according to an accidental heating curve 150 for adjustment of the automatic feedback controller. This accidental heating curve can be approximated under consideration of the above discussion by two straight line sections 151 and 152, which intersects at point 153 and which form a certain angle at point 153. The end point 154 of the heating curve 150 or respectively of the straight line 151 is formed by coordinating of a certain minimum outside temperature $\theta_{Amin}$ to a maximum feed line temperature $\theta_{Vmax}$. Thus there results a certain room temperature $\theta_{R-act}$ at the point 155. Now the deviation of the actual room temperature $\theta_{R-act}$ from the set point room temperature is formed according to point 156. It is to be assumed initially that this difference is disposed such that $\theta_{R-act}$ is smaller than $\theta_{R-set}$, and in fact smaller by a certain adjustable threshold. The adjustable threshold is to correspond to a value represented by point 157. If the point 155 would be disposed inside of the distance length between points 156 and 157, then this would be accepted as an intentional deviation. Now it is determined initially, if the signal values of the heating plant indicate, that the heating plant is in its rest state. For this purpose the values $\theta_A$, $\theta_V$, and $\theta_R$ have to be constant or have to be considered as constant within small limits. It is assumed that the actual state of such a heating system placed in a rest position is disposed at point 158 of FIG. 7. This means that in case of a predetermined outside temperature $\theta_{A-act}$ a certain feed line temperature $\theta_{V-act}$ has been established, to which also the room temperature $\theta_{R-act}$ according to point 155 is to be counted. In order to change the room temperature $\theta_{R-act}$ to the value $\theta_{R-set}$, the curve 150 would have to be shifted in a parallel direction toward a curve 159. Since the curve 150 or, respectively, the curve 159 run according to equation (1)

$$\theta_{V23} = \frac{\frac{\theta_{Vmax} + \theta_{RLmax}}{2} - \theta_{RNS}}{(\theta_{RNS} - \theta_{Amin})^{1/n}} (\theta_R - \theta_A)^{\frac{1}{n}} + \frac{\frac{\theta_{Vmax} + \theta_{RLmax}}{2}}{(\theta_{RNS} - \theta_{Amin})} (\theta_R - \theta_A) + \theta_R \quad (1)$$

The relationship of equation (1) cannot be reconstructed without complications with a simple computer, instead the approximate straight lines 151 and 152 are shifted parallel to each other such that the straight lines 160 and 161 are formed, which abut together at point 162 and which form there the angle already mentioned relative to each other. The point 154 moves on a line of the value of the maximum feed line temperature $\theta_{Vmax}$ to a new minimum outside temperature $\theta_{Amin}$ such that it becomes point 154'. This corresponds to a new coordination of the maximum feed line temperature $\theta_{VMax}$ to a new minimum outside temperature. $\theta_{Amin2}$. The point 153, which is the connection point of the two straight lines 151 and 152, or respectively, the point 162 as the intersection point of the two straight lines 160 and 161 corresponds to the point 128 of FIG. 6. This point 128 is defined by the equations (18), (19) and (20):

$$\theta_{VST} = n^{n/(1-n)} \left( \frac{n+1}{2} \theta_{Vmax} + \frac{n-1}{2} \theta_{RLmax} - n\theta_{RNS} \right) + \theta_R \quad (18)$$

$$K = n^{n/(1-n)} \left( \frac{n+1}{2} \theta_{Vmax} + \frac{n-1}{2} \theta_{RLmax} - n\theta_{RNS} \right) \quad (19)$$

$$\theta_{VST} = K + \theta_R \quad (20)$$

It has to be determined initially if the actual state of the heating system according to point 158 is lower or higher than the point 153. This can be determined by forming the difference of the outside temperature $\theta_{A\text{-}act}$ corresponding to point 158 versus the outside temperature, which corresponds to point 153. If the value for the maximum feed line temperature, for example 90 degrees centigrade, is entered into equation (18)

$$\theta_{VST} = n^{n/(1-n)} \left( \frac{n+1}{2} \theta_{Vmax} + \frac{n-1}{2} \theta_{RLmax} - n\theta_{RNS} \right) + \theta_R \quad (18)$$

and if the actual value of the room temperature $\theta_{R\text{-}act}$ is measured, then the support temperature for the feed line temperature $\theta_{VST}$ can be calculated according to equation (20).

$$\theta_{VST} = K + \theta_R \quad (20)$$

Since according to the assumptions the connection between the points 155 and 158 is to run as a straight line, the point 153 results as an extension of this straight line beyond the point 158. Furthermore, according to the assumptions the point 153 represents the connection point of the straight lines 152 and 151 at which the angle relation Q can be formed. The point 154 is fixed based on the coordination of the maximum feed line temperature relative to the minimum outside temperature. Thus a computer is able to produce and reproduce the straight lines 152 and 151. If the point 153, as shown in FIG. 3, is disposed above the point 158 of the actual state, then the computer can determine the new heating curve 159 or, respectively, the straight lines 160 and 161 approximating the same by shifting the point 155 by the control deviation on the axis of the room temperature $\theta_R$. The angle $\alpha$ remains here constant. The straight line 161 and the straight line 152 have to form the same angle $\alpha$ relative to the straight line of the room temperature $\theta_R$. Just as well this angle can be measured relative to the abscissa as well as with respect to the room temperature $\theta_R$. If the point 153 is disposed below the point 158, then an analogous procedure is performed.

Figure 8:
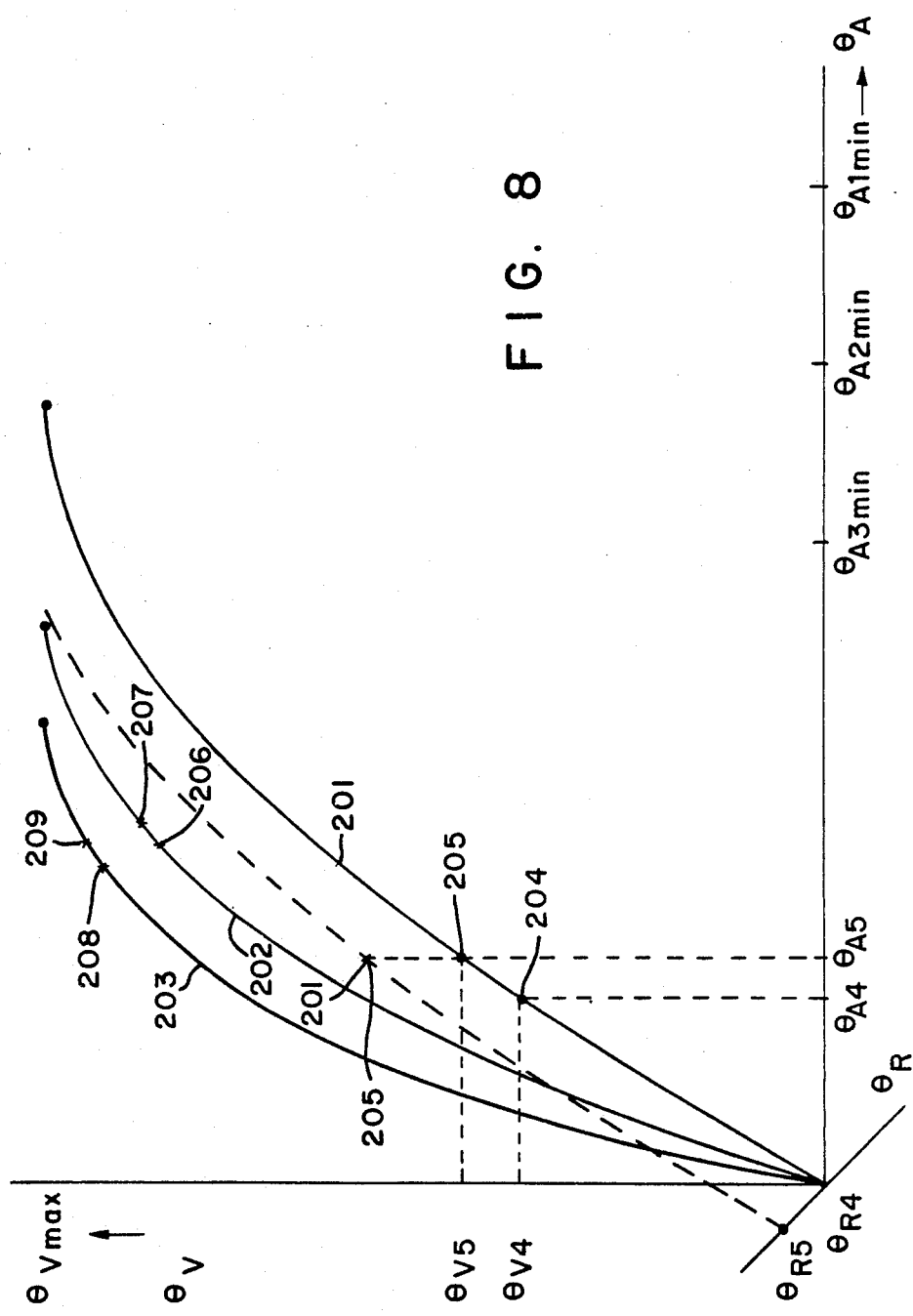
FIG. 8 is a view of a diagram illustrating the dependence of the feed line temperature $\theta_V$ on the outside temperature $\theta_A$ at constant room temperature.

Three curves 201, 202, 203 are shown in FIG. 8, which are distinguished in that the maximum feed line temperature $\theta_{Vmax}$ is reached at different minimum outside temperatures $\theta_{Amin}$. Since according to the invention method a feed line temperature dependent control is to be established for an existing heating point of a heating plant of initially unknown power parameters, the procedure is such that first a certain measurement value 204 is run, which is associated with a certain feed line temperature $\theta_{V4}$ and a certain momentary outside temperature $\theta_{V4}$, for example under constant outside temperature conditions. The values are measured and stored. If the outside temperature changes to a value $\theta_{A5}$, then this results in a curve point 205, which is associated with a certain feed line temperature $\theta_{V5}$. This value is also stored. The slope of the curve 201 between the points 204 and 205 can now be determined by difference formation of the two measurement values 204 and 205 in a way to be described below. If this slope is known, then one can conclude the end point of the curve 201 in a way to be described below. This means the point can be determined where a minimum outside temperature $\theta_{Amin}$ of the curve 201 is reached for the maximum feed line temperature. Therefore, the heating curve can be determined by measurement of at least two points, which heating curve describes the system as a control characteristic curve resulting from accidentally generated dependencies. If the measurement points 206 and 207 would result in the described manner and way in case of a measurement, then one could determine the maximum feed line temperature $\theta_{Vmax}$ based on equation (1), where the maximum feed line temperature corresponds to another minimum outside temperature, that is to the outside temperature $\theta_{A2min}$. Analogous relationships hold for the measurement values 208 and 209 on the third curve 203.

The minimum outside temperature $\theta_{Amin}$, where the maximum feed line temperature $\theta_{Vmax}$ has to be reached, can be determined by evaluation of two measurement points as described in the following.

In the case that the room temperature $\theta_R$ has changed from $\theta_{R4}$ to the value $\theta_{R5}$ caused by the system between the measurements of the points 204 and 205, then not the point 204 but the value 205 is obtained on the curve 201', which is shifted by the room temperature change value relative curve 201. Thus the position of curve 201 can be concluded as described later by introduction of the room temperature change.

The starting point is equation (2), where $\theta_V$ represents the feed line temperature in degrees centigrade, $\omega$ is the difference between the set point of the standard room temperature and the minimum outside temperature according to equation (17). The dimension is again degrees centigrade.

$$\omega 32 \ \theta_{RNS} - \theta_{Amin}$$

$\xi$ means the average temperature between feed line and return line less the standard room temperature set point in degrees centigrade according to equation (51):

$$\xi = \frac{\theta_{Vmax} + \theta_{RLmax}}{2} - \theta_{RNS} \quad (51)$$

t represents the difference between room and outside temperature according to equation (5) and the dimension is degrees centigrade.

$$t = \theta_R - \theta_A \qquad (5)$$

Φ means the middle temperature between the maximum feed line and return line temperatures according to equation (52) in degrees centigrade:

$$\phi = \frac{\theta_{Vmax} - \theta_{RLmax}}{2} \qquad (52)$$

n indicates a radiator coefficient, a value of 1.3 is employed, which does not carry a dimension and which holds for convectors and radiators. It holds by definition that $\theta_{Amin}$ is the value, at which the standard room temperature set point value is just reached.

The control depending on the outside temperature comprises a room temperature sensor, an outside temperature sensor, a feed line temperature sensor, or a return line temeperature sensor. The maximum feed line and return line temperatures are fixed. Partial differentiation of equation (2) with respect to the outside temperature results in equation (53):

$$\frac{\partial \theta_V}{\theta_R} = -n^{-1}\omega^{-1/n}\xi t^{(1-n)/n} - \omega^{-1}\phi \qquad (53)$$

Equation (54) results from partial differentiation of equation (2) with respect to $\theta_R$:

$$\frac{\partial \theta_V}{\partial \theta_R} = -n^{-1}\omega^{-1/n}\xi t^{(1-n)/n} + \omega^{-1}\phi + 1 \qquad (54)$$

Equation (25) results from equations (53) and (54), which can be transformed into equations (26) and (27). Equation (28) is obtained by resolving equation (27) for $\omega^{-1/n}$.

$$d\theta_V = (-n^{-1}\omega^{-1/n}\xi t^{(1-n)/n} - \omega^{-1}\Phi)d\theta_A + \qquad (25)$$
$$(n^{-1}\omega^{-1/n}\xi t^{(1-n)/n} + \omega^{-1}\Phi + 1)d\theta_R$$

$$d\theta_V = -n^{-1}\omega^{-1/n}\xi t^{(1-n)/n}d\theta_A - \omega^{-1}\Phi d\theta_A + \qquad (26)$$
$$n^{-1}\omega^{-1/n}\xi t^{(1-n)/n}d\theta_R + \omega^{-1}\phi d\theta_R + d\theta_R$$

$$d\theta_V = n^{-1}\omega^{-1/n}\xi t^{(1-n)/n}(d\theta_R - d\theta_A) + \qquad (27)$$
$$\omega^{-1}\Phi(d\theta_R - d\theta_A) + d\theta_R$$

$$\omega^{-1/n} = \frac{(d\theta_V - d\theta_R) - \omega^{-1}\Phi(d\theta_R - d\theta_A)}{n^{-1}\xi t^{(1-n)/n}(d\theta_R - d\theta_A)} \qquad (28)$$

It has to be considered that upon equality of $d^{\theta_R}$ with $d^{\theta_A}$ the expression $\omega^{-1/n}$ becomes indefinite, since the corresponding number in equation (27) becomes zero. Equation (29) results from entering equation (18) into equation (2).

$$\theta_V = \frac{(d\theta_V - d\theta_R) - \omega^{-1}\Phi(d\theta_R - d\theta_A)}{n^{-1}\xi t^{(1-n)/n}(d\theta_R - d\theta_A)} \xi t^{1/n} + \omega^{-1}\phi t + \theta_R \qquad (29)$$

Equation (30) is obtained by transformation of equation (29).

$$\theta_V = nt\frac{d\theta_V - d\theta_R}{d\theta_R - d\theta_A} + \omega^{-1}\phi t(1-n) + \theta_R \qquad (30)$$

Equation (31) is obtained by resolving equation (30) for ω, where again holds that $d^{\theta_R}$ is to be unequal $d^{\theta_A}$. At the same time a transition is made from a differential to a measurable difference.

$$\omega = \frac{\phi t(1-n)}{(\theta_V - \theta_R) - nt\frac{\Delta\theta_V - \Delta\theta_R}{\Delta\theta_R - \Delta\theta_A}} \qquad (31)$$

Since ω and the minimum outside temperature are connected according to equation (17) via the standard room temperature set point the equation (31) can be written as equation (32):

$$\theta_{Amin} = \theta_{RNS} - \frac{\phi t(1-n)}{(\theta_V - \theta_A) - nt\frac{\Delta\theta_V - \Delta\theta_R}{\Delta\theta_R - \Delta\theta_A}} \qquad (32)$$

Thus it is shown that by measurement of two points the minimum outside temperature can be determined, where the maximum feed line temperature is to be reached.

In the case where the control system of the heating plant does not control the feed line temperature depending on the outside temperature, but the return temperature depending on the outside temperature, then equation (33) holds. After partial differentiation and resolving with respect to ω then the following dependency according to equation (34) can be obtained for the return line temperature:

$$\theta_{RL} = \omega^{-1/n}\xi t^{1/n} - \omega^{-1}\phi t + \theta_R \qquad (33)$$

$$\theta_{Amin} = \theta_{RNS} - \frac{\phi t(1-n)}{nt\frac{\Delta\theta_{RL} - \Delta\theta_R}{\Delta\theta_R - \Delta\theta_A} - (\theta_{RL} - \theta_R)} \qquad (34)$$

In the case that any mixing temperatures are to be run at the heating plant depending on the outside temperature, then equations (32) and (34) have to be combined depending on the kind of the mixing temperature.

The finding of the end point of the heating curve, that is of the value of $\theta_{Vmax}$ which belongs to $\theta_{Amin}$, is described by the function according to equation (2).

$$\theta_V = \omega^{\frac{1}{n}} \xi t^{\frac{1}{n}} + \omega^{-1}\phi t + \theta_R \qquad (2)$$

Here $\theta_V$ means the feed line temperature in degrees centigrade, ω is the difference between the standard temperature set point and the minimum outside temperature, n is the radiator coefficient, ξ is the arithmetic middle value between the maximum feed line temperature and the maximum return line temperature reduced by the value of the standard temperature set point, Φ is half the difference between the feed line temperature maximum value and the return line temperature maximum value, t is the difference between room temperature and the outside temperature and $\theta_R$ is the room temperature.

Equation (5) holds for t:

$$t = \theta_R - \theta_A \qquad (5)$$

This means that in a regular case the room temperature $\theta_R$ is larger than the outside temperature $\theta_A$. The ratios can change in so far as that the difference approaches zero or becomes negative, respectively. A control of the heating plant for these two values however does not make sense. In addition, equation (17) holds for $\omega$:

$$\omega = \theta_{RNS} - \theta_{Amin} \tag{17}$$

Now the relation according to inequality (35) holds between t and $\omega$:

$$0 \leq t \leq \omega \tag{35}$$

Correspondingly, it can be gathered from inequality (35) that the control of a heating plant or respectively its control depending on the outside temperature makes only sense in that region of values, where t is larger than zero and smaller or equal to $\omega$. If one transfers this knowledge according to equations (5), (17) and (35) to the fact situation according to equation (2), then equation (2) can be described according to equation (36) as follows:

$$\theta_v = \xi \left(\frac{t}{\omega}\right)^{1/n} + \Phi\left(\frac{t}{\omega}\right) + \theta_R \tag{36}$$

It can be recognized from equation (36) that the term cannot be resolved with respect to $\omega$.

The invention enters here by further considering that the exponent of the radiator coefficient according to equation (37)

$$n = 1.3 \tag{37}$$

can also be written according to equation (38):

$$n \approx 4/3 \tag{38}$$

without the introduction of a substantial error, at least not an error of such a size as occurs interfering during the control of a heating plant. The equation (39) can be found from the kind of consideration of equation (38) by insertion into one of the addends of equation (36).

$$\left(\frac{t}{\omega}\right)^{1/n} \approx \left(\frac{t}{\omega}\right)^{3/4} = \tag{39}$$

$$\sqrt[4]{\left(\frac{t}{\omega}\right)^3} = \sqrt[2]{\sqrt[2]{\left(\frac{t}{\omega}\right) \cdot \left(\frac{t}{\omega}\right)}}$$

Starting from the knowledge according to equation (39) now equation (36) can be fully written according to equation (40).

$$\theta_V = \sqrt{\left(\frac{t}{\omega}\right)\sqrt{\left(\frac{t}{\omega}\right)}}\, \xi + \Phi\left(\frac{t}{\omega}\right) + \theta_R \tag{40}$$

Figure 9:
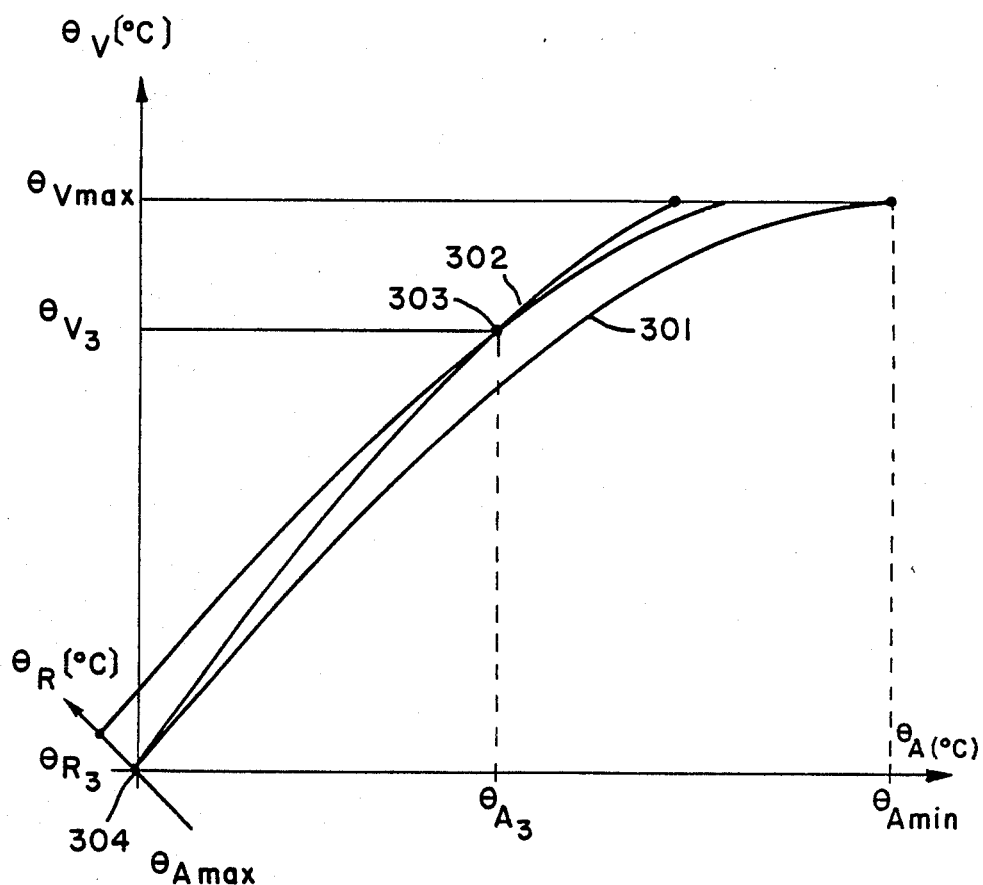
FIG. 9 is a view of a diagram illustrating the dependence of the feed line temperature $\theta_V$ on the outside temperature $\theta_A$.

The equation (40) is presented in a shape which can be calculated without problem by a commercial microcomputer and it represents thus a relationship which runs according to curve 301 of FIG. 9. This curve coincides at the two end points for $\theta_{Amax}$ and $\theta_{Amin}$ completely with the curve according to equation (2), only in the region coming close to $\theta_{Amax}$ the curve leads to higher $\theta_V$-values depending on $\theta_A$ as would correspond to the curve according to equation (2). These deviations however are compensated at least in part by rounding in the microcomputer. In view of the errors caused by the final function control elements of an automatic feedback control of a heating plant, these errors do not weigh heavily.

If one starts with an arbitrary feed line temperature control, which could also be a return line temperature control or the control of a middle or average temperature, where these temperatures represent all values derived from the feed line temperature and are variable with the feed line temperature, according to a curve 302, which however is unknown, then the problem arises to move from the actual curve 302 to the optimized curve 301 in the automatic feedback control. For this purpose an arbitrary point 303 is made the operating point, which point results based on the automatic feedback control setting of the building parameters and from other values. A certain feed line temperature $\theta_V$, which is prevailing at the momentary outside temperature $\theta_A$ belongs to the value 303. The two temperatures lead to a temperature $\theta_R$ based on the automatic feedback control and the heating plant under consideration. The room temperature $\theta_{V3}$ remained up to now substantially unconsidered, since up to now a control depending purely on the outside temperatures for the control of the feed line temperature was considered.

In case the automatically adjusting room temperature is compared with the predetermined room temperature set point, then a difference results which has to be fed back. Before this occurs the maximum point $\theta_{Vmax}$ of the feed line temperature is calculated using the measured room temperature actual value $\theta_{R3}$ and the measured value pair for $\theta_{V3}/\theta_{A3}$, which maximum point corresponds to the minimum outside temperature $\theta_{Amin}$, if the curve 301 does not run through the zero point, but through the value $\theta_{R3}$, that is would be shifted in parallel. For this purpose equation (2) is employed and is varied so long until the function provides the values $\theta_{V3}$ and the room temperature $\theta_{R3}$ for the value $\theta_{A3}$. This variation is performed according to the Newtonian iteration method. This is expressed by equation (41).

$$X_{m+1} = X_m - \frac{f(X_m)}{f'(X_m)} \tag{41}$$

Now the function and the derived function are described by equation (42)

$$F(X_m) = f(\omega_m) = \theta_{V3} - \tag{42}$$

$$\left(\xi\left(\frac{t}{\omega_m}\right)^{1/n} + \Phi\left(\frac{t}{\omega_m}\right) + \theta_R\right)$$

and $$f(X_m) = f'(\omega_m) = \tag{43}$$

-continued $$(1/n)\xi \cdot \omega_m \left(\frac{t}{\omega_m}\right)^{1/n} + \Phi \omega_m^{-1}\left(\frac{t}{\omega_m}\right)$$

These equations read under substitution as equation (44):

$$\omega_{m+1} = \omega_m - \frac{\xi\left(\frac{t}{\omega_m}\right)^{1/n} + \Phi\frac{t}{m} + \theta_R - \theta_V}{(1/n)\xi\omega_m\left(\frac{t}{\omega_m}\right)^{1/n} + \Phi\omega_m^{-1}\left(\frac{t}{\omega_m}\right)} \quad (44)$$

Removing the brackets from $\omega_m$ transforms this into equation (45).

$$\omega_{m+1} = \omega_m \left(1 + n \frac{\xi\left(\frac{t}{\omega_m}\right)^{1/n} + \Phi\left(\frac{t}{\omega_m}\right) + \theta_R - \theta_V}{\xi\left(\frac{t}{\omega_m}\right)^{1/n} + n\Phi\left(\frac{t}{\omega_m}\right)}\right) \quad (45)$$

This equation (45) thus represents a curve which is disposed according to point 304 parallel shifted versus the curve 301 by the amount difference of $\theta_{R3}$ and $\theta_R$ set point. By moving the room temperature to the room temperature set point thus this curve can be made to coincide with the curve 301. The value of the maximum feed line temperature $\theta_{Vmax}$ is thus determined, which value is associated with the minimum outside temperature $\theta_{Amin}$ as the heating system is optimized. Thus the automatic feedback controller can control each desired point of the feed line temperature depending on the outside temperature according to curve 301, and this can be done in fact by using the simplified equation (40).

It will be understood that each of the elements described above, or two or more together, may also find a useful application in other types of automatic control system configurations and heating procedures differing from the types described above.

While the invention has been illustrated and described as embodied in the context of a method for formation of a set point of a control or of an automatic feedback control for a heating plant, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A control method for a heating plant comprising heating a fluid medium disposed in a heater;
   carrying the fluid medium from the heater to a heat exchanger provision via a feed line;
   returning thermally depleted fluid medium from the heat exchanger to the heater via a return line;
   controlling the temperature of the fluid medium along a sequence of two straight line sections in a diagram of outside temperature versus feed fluid medium temperature between a first end point where the outside temperature is equal to the fluid medium temperature in the feed line and a second end point where the minimum outside temperature corresponds to the maximum feed line temperature such that a third point on the curve for constant inside room temperature between the said end points is connected with a straight line to each of the end points.

2. A control method for a heating plant comprising heating a fluid medium disposed in a heater; carrying the fluid medium from the heater to a heat exchanger provision via a feed line;
   returning thermally depleted fluid medium from the heat exchanger to the heater via a return line; contolling the temperature of the fluid medium along a sequence of two straight line sections in a diagram of outside temperature versus feed fluid medium temperature between a first end point where the outside temperature is equal to the fluid medium temperature in the feed line and a second end point where the minimum outside temperature corresponds to the maximum feed line temperature such that a third point on the curve for constant inside room temperature between the said end points is connected with a straight line to each of the end points,
   wherein the third point is selected to the nonlinear curve where the difference distance between a straight line from the first end point to the second end point and the nonlinear curve is about a maximum when determined for each outside temperature state.

3. The control method for a heating plant according to claim 2 wherein the maximum of the difference distance is determined according to the following equation:

$$\frac{\partial E}{\partial A} = -\alpha - \frac{1}{n} \psi(t)^{\frac{1}{n}-1} - \phi = 0 \quad (12)$$

4. The control method for a heating plant according to claim 2 wherein
   the straight line connecting the first end point to the third point has a slope angle $\alpha$;
   the straight line connecting the third point to the second end point has a slope angle $\beta$;
   wherein the ratio $Q = \alpha/\beta$ of the two straight lines is selected according to the following relationship:

$$Q = \left(\frac{\theta_{RNS} - \theta_{VSTN}}{\theta_{Vmax} - \theta_{VSTN}}\right)\left(1 - n^{-\frac{n}{1-n}}\right) \quad (24)$$

5. A control method for a heating plant comprising heating a fluid medium disposed in a heater;
   carrying the fluid medium from the heater to a heat exchanger provision via a feed line;
   returning thermally depleted fluid medium from the heat exchanger to the heater via a return line;
   measuring the temperature of the heater;
   measuring the outside temperature;
   measuring the inside room temperature;

automatically controlling the temperature of the fluid medium with the heat input of the heater based on the actual inside and outside temperature values; determining initially the deviation of the inside room temperature $\theta_{R\text{-}Act}$ from the room set point temperature $\theta_{R\text{-}Set}$ and comparing the resulting difference with an adjustable threshold and the set point of the heating plant belonging to the inside room temperature $\theta_{R\text{-}set}$ is determined by shifting in parallel the heating curve in a plot of temperature $\theta_{VST}$ versus the outside temperature $\theta_A$ according to the relationship $$\theta_{VST} = K + \theta_R$$

where VST is the feed line temperature by the deviation of the values $\theta_{R\text{-}set} - \theta_{R\text{-}Act}$.

6. The control method for a heating plant according to claim 5 wherein
the relationship of the heating curve is approximated by two straight lines which meet the following conditions:

$$\alpha = \frac{\theta_{VSTN} - \theta_{RNS}}{\theta_{ASTN} - \theta_{RNS}} \beta = \frac{\theta_{Vmax} - \theta_{VSTN}}{\theta_{Amin} - \theta_{ASTN}}$$

7. The control method for a heating plant according to claim 5 wherein
the relationship of the heating curve is approximated by more than two straight lines where the end members meet the following conditions:

$$\alpha = \frac{\theta_{VSTN} - \theta_{RNS}}{\theta_{ASTN} - \theta_{RNS}} \beta = \frac{\theta_{Vmax} - \theta_{VSTN}}{\theta_{Amin} - \theta_{ASTN}}$$

8. A control method for a heating plant comprising heating a fluid medium disposed in a boiler;
carrying the fluid medium from the boiler to a heat exchanger provision via a feed line;
returning thermally depleted fluid medium from the heat exchanger to the heater via a return line;
controlling the temperature of the fluid medium depending on the outside temperature along a curve meeting the following relationship $$\theta_V = \omega^{-\frac{1}{n}} \xi t^{\frac{1}{n}} + \omega^{-1} \Phi_t + \theta_R \qquad (2)$$

where $\theta_V$ is the feed line temperature in degrees centigrade; $\omega$ is the difference between the room temperature set point value and the minimum outside temperature; n is the radiator coefficient;
$\xi$ is the arithmetic medium value between the maximum feed line temperature and the maximum return line temperature decreased by the value of the room temperature set point;
$\Phi$ is half the difference between the maximum value of the feed line temperature and the maximum value of the return line temperature;
t is the difference between the actual room temperature and the outside temperature; and
$\theta_R$ is the room temperature; where the temperature of the fluid medium is further defined by a relationship involving the room temperature and half the difference between the the maximum value of the feed line temperature and the maximum value of the return line temperature.

9. A control method for a heating plant according to claim 8 wherein the minimum outside temperature is determined according to the following relationship:

$$\theta_{Amin} = \theta_{RNS} - \frac{\theta_{t(1-n)}}{(\theta_V - \theta_A) - nt\frac{\Delta\theta_V - \Delta\theta_R}{\Delta\theta_R \Delta\theta_A}} \qquad (32)$$

where
$\theta_V$ is the average feed line temperature;
$\theta_R$ is the average room temperature and $\Delta\theta_V$ is their difference.

10. A control method for a heating plant according to claim 8 wherein the feed line temperature is automatically controlled according to the following relationship:

$$\theta_V = \sqrt{\left(\frac{t}{\omega}\right)}\sqrt{\left(\frac{t}{\omega}\right)} \xi + \Phi\left(\frac{t}{\omega}\right) + \theta_R \qquad (40)$$

11. A control method for a heating plant according to claim 8 wherein the value of the maximum feed line temperature $\theta_{Vmax}$ starting from a measured pair of values as desired belonging to the minimum outside temperature is determined for a feed line temperature resulting upon an actual value outside temperature according to the Newtonian iteration method.

12. A control system for a heating plant comprising a heater for a fluid medium;
feed line connected to the heater for carrying the fluid medium to a heat exchanger provision;
a return line connected to the heat exchanger to receive thermally depleted fluid medium;
a control unit for controlling the temperature of the fluid medium along a sequence of two straight line sections in a diagram of outside temperature versus feed fluid medium temperature between a first end point where the outside temperature is equal to the fluid medium temperature in the feed line and a second point where the minimum outside temperature corresponds to the maximum feed temperature such that a third point on the curve for constant inside temperature between the said end points is connected with a straight line to each of the end points.

13. A control system for a heating plant comprising a heater for a fluid medium;
feed line connected to the heater for carrying the fluid medium to a heat exchanger provision;
a return line connected to the heat exchanger to receive thermally depleted fluid medium;
a control unit for controlling the temperature of the fluid medium along a sequence of two straight line sections in a diagram of outside temperature versus feed fluid medium temperature between a first end point where the outside temperature is equal to the fluid medium temperature in the feed line and a second point where the minimum outside temperature corresponds to the maximum feed temperature such that a third point on the curve for constant inside temperature between the said end points is connected with a straight line to each of the end points.
wherein the third point is selected on the nonlinear curve where the difference distance between a straight line from the first end point to the second end point and the nonlinear curve is about a maximum when determined for each outside temperature state.

14. The control system for a heating plant according to claim 13
wherein the maximum of the difference distance is determined according to the following equation:

$$\frac{\partial E}{\partial A} = -\alpha - \frac{1}{n} \psi(t)^{\frac{1}{n} - 1} - \Phi = 0 \quad (12)$$

15. The control system for a heating plant according to claim 13 wherein
the straight line connecting the first end point to the third point has a slope angle $\alpha$;
the straight line connecting the third point to the second end point has a slope angle $\beta$;
wherein the ratio $Q = \alpha/\beta$ of the two straight lines is selected according to the following relationship:

$$Q = \left( \frac{\theta_{RNS} - \theta_{VSTN}}{\theta_{Vmax} - \theta_{VSTN}} \right) (1 - n^{-\frac{n}{1-n}}) \quad (24)$$

16. The control system for a heating plant according to claim 13 wherein
the relationship of the heating curve is approximated by two straight lines which meet the following conditions:

$$\alpha = \frac{\theta_{VSTN} - \theta_{RNS}}{\theta_{ASTN} - \theta_{RNS}} \beta = \frac{\theta_{Vmax} - \theta_{VSTN}}{\theta_{Amin} - \theta_{ASTN}}$$

17. A control apparatus for a heating plant comprising
a boiler for a fluid medium;
feed line connected to the boiler for carrying the fluid medium to a heat exchanger provision;
a return line connected to the heat exchanger to receive thermally depleted fluid medium;
a control unit for controlling the temperature of the fluid medium depending on the outside temperature along a curve meeting the following relationship $$\theta_V = \omega^{-\frac{1}{n}} \xi t^{\frac{1}{n}} + \omega^{-1} \phi_t + \theta_R \quad (2)$$

where $\theta_V$ is the feed line temperature in degrees centigrade; $\omega$ is the difference between the room temperature set point value and the minimum outside temperature with the minimum outside temperature being defined as the temperature value calling for full actuation of the heating plant; n is the radiator coefficient;
$\xi$ is the arithmetic medium value between the maximum feed line temperature and the maximum return line temperature decreased by the value of the room temperature set point;
$\Phi$ is half the difference between the maximum value of the feed line temperature and the maximum value of the return line temperature;
t is the difference between the actual room temperature and the outside temperature; and $\theta_R$ is the room temperature;
where the temperature of the fluid medium is further defined by a relationship involving the room temperature and half the difference between the the maximum value of the feed line temperature and the maximum value of the return line temperature.

18. A control apparatus for a heating plant according to claim 17 wherein the minimum outside temperature is determined according to the following relationship:

$$\theta_{Amin} = \theta_{RNS} - \frac{\theta_{t(1-n)}}{(\theta V - \theta A) - n t \frac{\Delta \theta_V - \Delta \theta_R}{\Delta \theta_R - \Delta \theta_A}} \quad (32)$$

where
$\overline{\theta_V}$ is the average feed line temperature;
$\overline{\theta_R}$ is the average room temperature and $\theta_V$ is their difference.

19. A control apparatus for a heating plant according to claim 17 wherein the feed line temperature is automatically controlled according to the following relationship:

$$\theta_V = \sqrt{\left(\frac{t}{\omega}\right) \sqrt{\left(\frac{t}{\omega}\right)} + \phi\left(\frac{t}{\omega}\right)} + \theta_R \quad (40)$$

20. A control apparatus for a heating plant according to claim 17 wherein the feed line temperature is automatically controlled according to the following relationship:
where the value of the maximum feed line temperature $\theta_{Vmax}$ starting from a measured pair of values as desired belonging to the minimum outside temperature is determined for a feed line temperature resulting upon an actual value outside temperature according to the Newtonian iteration method.

* * * * *

UNITED STATES PATENT AND TRADEMARK OFFICE
CERTIFICATE OF CORRECTION

PATENT NO. : 4,824,014
DATED : April 25, 1989
INVENTOR(S) : Dieter Stuch

It is certified that error appears in the above-identified patent and that said Letters Patent is hereby corrected as shown below:

Title page:

Please cancel under (63) --Continuation-in-part of Ser. No. 000,132, Jul. 30. 1983 -- and insert "Continuation-in-part application of PCT/DE 83/00132, July 30, 1983".

Signed and Sealed this

Twenty-sixth Day of June, 1990

*Attest:*

HARRY F. MANBECK, JR.

*Attesting Officer*   *Commissioner of Patents and Trademarks*